(Model.)

2 Sheets—Sheet 1.

C. B. LONG.
Machine for Crimping the Uppers of Boots and Shoes.

No. 226,866. Patented April 27, 1880.

Witnesses.
S. N. Piper
W. W. Lunt

Inventor.
Charles B. Long
by attorney
R. H. Eddy

N. PETERS, PHOTO-LITHOGRAPHER, WASHINGTON, D. C.

(Model.) 2 Sheets—Sheet 2.
C. B. LONG.
Machine for Crimping the Uppers of Boots and Shoes.
No. 226,866. Patented April 27, 1880.
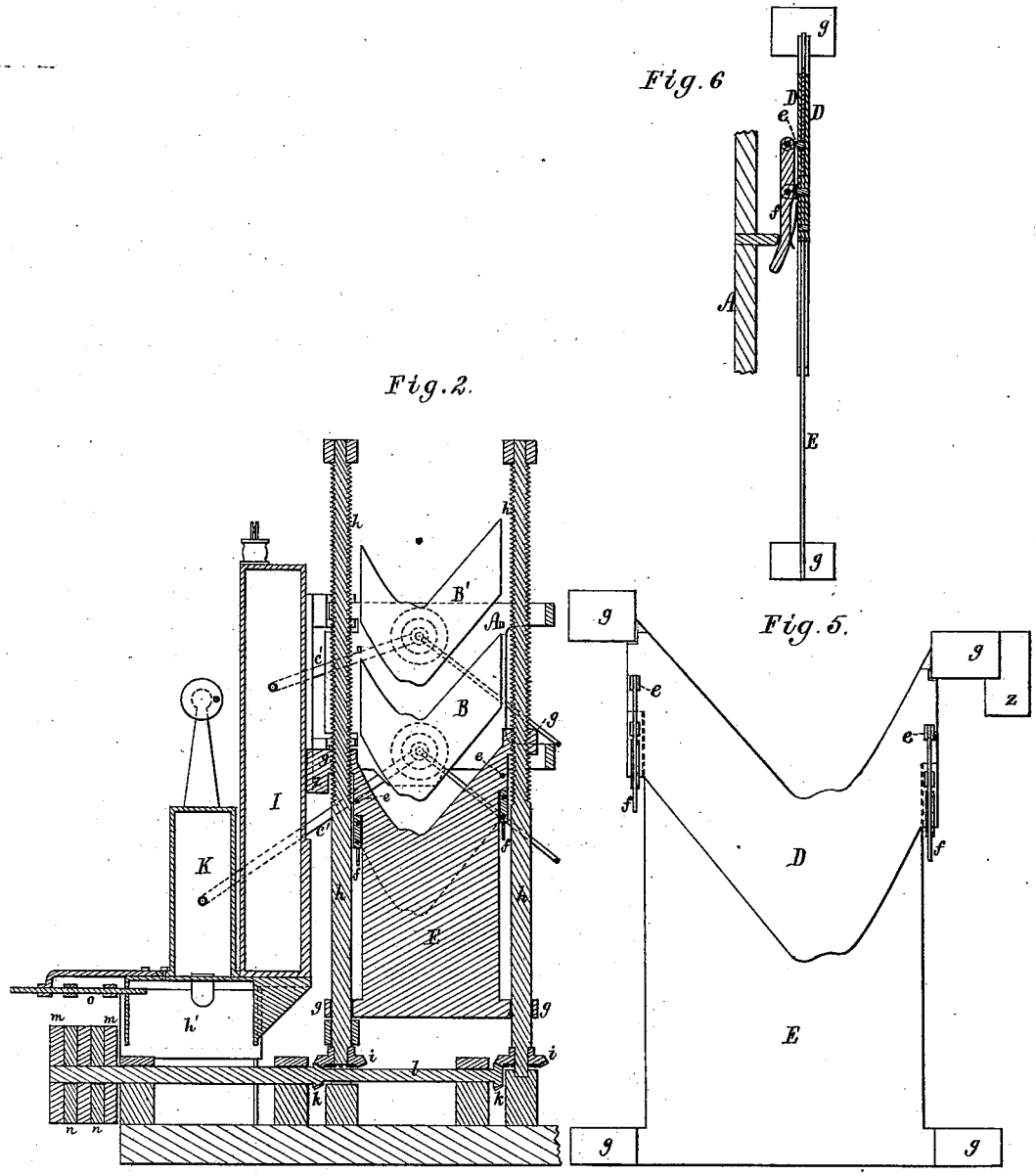
Witnesses:
S. N. Piper
W. W. Lunt
Inventor.
Charles B. Long.
by attorney,
R. H. Eddy

UNITED STATES PATENT OFFICE.

CHARLES B. LONG, OF WORCESTER, MASSACHUSETTS.

MACHINE FOR CRIMPING THE UPPERS OF BOOTS AND SHOES.

SPECIFICATION forming part of Letters Patent No. 226,866, dated April 27, 1880.

Application filed March 1, 1880. (Model.)

*To all whom it may concern:*

Be it known that I, CHARLES B. LONG, of the city and county of Worcester, of the State of Massachusetts, have invented a new and useful Improvement in Machinery for Crimping Leather for Boots and Shoes; and I do hereby declare the same to be described in the following specification and represented in the accompanying drawings, of which—

Figure 4:
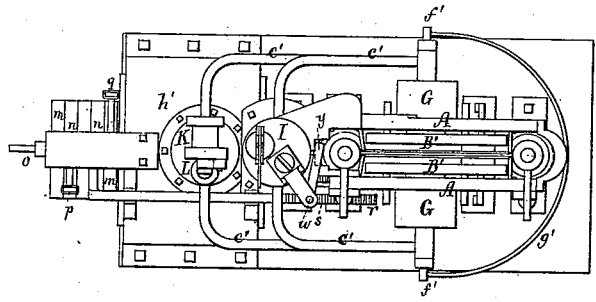
Figure 1:
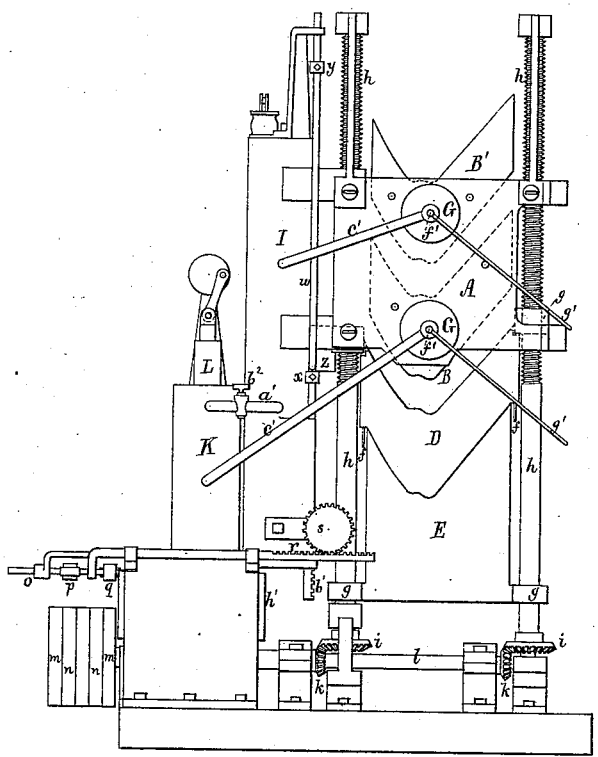
Figure 3:
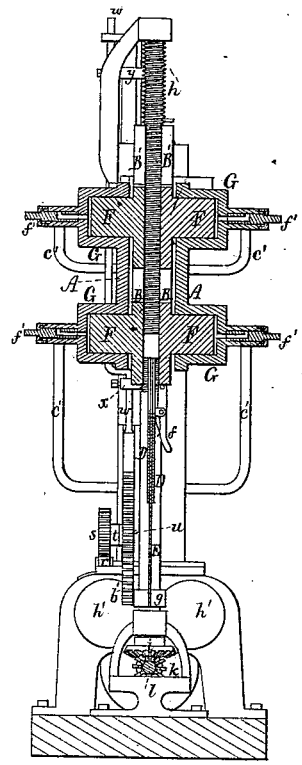

Figure 1 is a front elevation, Fig. 2 a vertical and longitudinal section, Fig. 3 a vertical and transverse section, and Fig. 4 a top view, of a machine embodying my invention. Figs. 5 and 6 are hereinafter described.

In the machine hereinafter described for effecting the crimping of leather I use jaws and a compound follower, the latter being composed of two exterior followers and an intermediate one—that is, one arranged directly between the said exterior followers and to move or slide with and independently of them. Furthermore, I employ with each set of jaws air-cylinders and pistons and mechanism for forcing air into such cylinders in order to press the jaws toward each other, using either a single pair or, what is preferable, two pairs of jaws, as occasion may require. By means of such air-cylinders and pistons, and by suitable cocks or devices for regulating the admission of air into the cylinders, I am enabled to secure an elastic or yielding pressure of the jaws upon the leather in order to enable the jaws to properly adapt themselves to it as it may vary in thickness.

The compound follower as herein described, arranged and to operate with the single set of jaws, as explained, I do not claim to be my invention, such being a subject of an application for a patent recently filed by Henry C. Pease. When such follower is used with two sets of jaws, as hereinafter explained, so as to pass from one to the other of them, the crimping of the leather can be performed to better advantage than by using one set only of such jaws with such compound follower.

In the machine hereinafter described there is shown, as combined with the compound follower and jaws and mechanism for moving the follower upward and downward relatively to the jaws, a mechanism for automatically shifting the belts for operating the driving-shaft appertaining to the mechanism for moving the compound follower.

In the drawings, A represents the main frame of the machine, or that part of it which serves to support the two pairs of jaws B B and B' B', the latter pair, B' B', being situated over the first pair, and each jaw being adapted to the said frame, so as to be movable therein toward and away from its fellow jaw. Between the jaws, or arranged with them in manner as represented, is the compound follower, which consists of the two external followers or notched plates, D D, and the intermediate follower or notched plate, E. The two followers D D are parallel to one another, and arranged at a distance apart equal to or little greater than the thickness of the intermediate follower.

The said two followers D D are so connected at their opposite vertical edges that when moved they shall move each with the other. When at its lowest position between and relatively to the external followers the intermediate follower, at its top or upper edge, is even with the upper edges of the external followers, these latter followers being provided with bolts for bolting them to the internal follower.

Fig. 5 is a rear view of the compound follower and its bolting mechanism, while Fig. 6 is a vertical section taken through one of the bolts and the mechanism for operating it. The bolts are shown at e e as projecting from two bent levers, f f, which are fulcrumed to one of the exterior followers, and should be provided with springs to move them, so as to force the bolts into the intermediate follower, each lever at the proper time being moved in order to retract the bolt, to enable the intermediate follower to move upward independently of and between the external followers. This movement of each of the bolt-levers is effected by its bent arm, during the rise of the compound follower, being forced against a suitable stud or projection properly arranged within the frame.

I would further remark that on the external followers having attained the necessary altitude for the intermediate follower to rise independently of them, such external followers should be brought up against a suitable rest or abutment, such as will prevent them from moving farther upward. Such devices for locking and unlocking the followers, and for stopping the external followers in order to enable the intermediate follower to rise independently of them, are or may be such as appertain to the compound follower of the said Pease.

The compound follower shown in the drawings is represented as provided at its corners with tubular ears $g g$, through which pass vertically screw-rods $h h$, that should be so supported that each may revolve horizontally. These rods are screw-threaded, and screw into the upper pair of ears of the intermediate follower, and at their lower parts are provided with bevel-gears $i i$, to engage with two bevel-pinions, $k k$, fixed upon a driving-shaft, $l$, arranged and provided with fast and loose pulleys, as shown at $m$ and $n$ and $m$ and $n$.

The belt-shipper $o$, furnished with two eyes, $p q$, for belts to run through, and also around two of the aforesaid pulleys, is arranged and supported so as to move longitudinally, as occasion may require, in order to effect the shifting of the belts from their fast to their loose pulleys. These belts may proceed from one driving-drum, in which case one of them is to be a crossed belt, the object being to alternately revolve the driving-shaft in opposite directions. The belt-shipper is provided with a toothed rack, $r$, to engage with a pinion, $s$, fixed upon a shaft, $t$, upon which there is another pinion, $u$, to engage with a vertical sliding rack, $b'$. From this rack $b'$ a rod, $w$, projects upward and is provided with two arms, $x y$, extending from it, as represented.

There is to one of the upper ears of the compound follower a projection, $z$, which, during a descent of the follower and at the proper time, is carried into contact with the lower of the two arms, and effects therewith a downward movement of the vertical rack $b'$, whereby the shipper will be moved in one direction, it being in like manner moved in the opposite way when the projection $z$ is forced up to and caused to press upward the upper arm, and thereby effect a counter movement of the vertical rack.

From this it will be seen that the compound follower will be automatically moved vertically first upward and next downward, and that the belts to impart to the driving-shaft a movement first in one and next in the opposite direction will be automatically shifted relatively to the pulleys, each of said belts being on a fast pulley, while the other is on a loose one.

Each of the jaws has a piston, F, projecting from it into a hollow cylinder, G, extending from the frame A, such frame being supported by one of two air-reservoirs, I K, arranged as represented, and communicating with each other by a pipe, $a'$, provided with a stop-cock, $b^2$.

The smaller reservoir has upon it an air-forcing pump, L, for supplying it with air, and on the upper reservoir there may be a safety-valve.

The upper pair of the air-cylinders communicate with the longer reservoir by a pipe, $c'$, provided with a stop-cock, $f'$, the stems of the two stop-cocks being connected by a curved or arched rod, $g'$, so as to enable them to be moved or turned simultaneously to regulate the flow of air into the cylinder.

Furthermore, the air-cylinders of the lower set of jaws are similarly connected with the lesser air-reservoir by pipes $c'$, provided with stop-cocks $f'$, connected by a curved rod, $g'$, as described.

Both reservoirs are supported by a hollow or chambered base, $h'$, into which the lesser reservoir opens, the chamber in the said base serving also to hold compressed air.

By having the two reservoirs connected by a pipe provided with a stop-cock the air may be forced into but one of them when it may be desirable to use the lower set of jaws only with the compound follower.

On the said compound follower being raised upward it will first force the leather between the lower set of jaws, and next between the upper set of jaws, until its exterior followers may arrive at a position of rest, in order for the intermediate follower to be raised upward still farther, which subsequently taking place, the leather will be forced out from between the upper set of jaws and the exterior followers, it being duly stretched or crimped while passing between the jaws and by the action of the said compound follower.

What I claim as my invention is as follows, viz:

1. The jaws provided with pistons attached to and extending from them, and to operate as described, with cylinders sustained by the frame A, and provided with mechanism, as set forth, for supplying them with compressed air, such jaws being used with a follower, as explained.

2. The combination of the air-cylinders G and pistons F of the two sets of jaws provided and to operate with the compound follower, as set forth, with the separate air-cylinders I K, their connection-pipe $a'$, and a stop-cock, $b^2$, thereto, as set forth, and also with mechanism for supplying said cylinders with compressed air, the cylinders I K being connected with the cylinders G by pipes $c'$, provided with stop-cocks, all being to operate essentially as set forth.

3. The combination of a connecting-rod, $g'$, with the stems of the two stop-cocks of each pair of air-cylinders for operating the jaws, as set forth.

CHAS. B. LONG.

Witnesses:
JOSEPH M. DYSON,
THOMAS R. FOSTER.